(12) United States Patent
Skoglar et al.

(10) Patent No.: US 12,135,367 B2
(45) Date of Patent: Nov. 5, 2024

(54) METHODS AND SYSTEMS FOR LOCATING A USER EQUIPMENT DEVICE BASED ON SIGNAL TRAVEL TIME AND BIAS SUPPRESSION

(71) Applicant: Verizon Patent and Licensing Inc., Basking Ridge, NJ (US)

(72) Inventors: Per J Skoglar, Linköping (SE); David A Tornqvist, Linghem (SE)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 383 days.

(21) Appl. No.: 17/545,438

(22) Filed: Dec. 8, 2021

(65) Prior Publication Data
US 2023/0176206 A1 Jun. 8, 2023

(51) Int. Cl.
*G01S 13/87* (2006.01)
*G01S 5/02* (2010.01)
*G01S 5/10* (2006.01)
*H04W 4/029* (2018.01)

(52) U.S. Cl.
CPC ............ *G01S 13/876* (2013.01); *G01S 5/021* (2013.01); *G01S 5/10* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 10,908,299 | B1* | 2/2021 | Tadayon | G01S 5/0294 |
| 2010/0225541 | A1* | 9/2010 | Hertzog | G01S 5/10 |
| | | | | 342/387 |
| 2012/0307712 | A1* | 12/2012 | Watanabe | H04B 7/2606 |
| | | | | 370/315 |
| 2016/0327628 | A1* | 11/2016 | Perez-Cruz | G01S 5/14 |
| 2018/0329023 | A1* | 11/2018 | Perez-Cruz | G01S 5/021 |
| 2023/0007615 | A1* | 1/2023 | Keating | G01S 5/0273 |
| 2024/0069148 | A1* | 2/2024 | Baek | G01S 5/14 |

OTHER PUBLICATIONS

Au, et al., "The Latest Progress on IEEE 802.11mc and IEEE 802.11ai", Standards. Sep. 2016 | IEEE Vehicular Technology Magazine.

(Continued)

*Primary Examiner* — Mazda Sabouri

(57) ABSTRACT

An illustrative UE locator system determines a time measurement indicative of a signal travel time between a UE device and an access point device. The signal travel time corresponds to an apparent distance, presuming a line-of-sight (LoS) signal travel path, between a location of the UE device and a location of the access point device. The UE locator system also accesses, from a bias suppression datastore, bias suppression data configured for use in suppressing an influence of a bias between the apparent distance and a true distance between the location of the UE device and the location of the access point device. The bias is associated with a non-line-of-sight (NLoS) signal travel path between the UE device and the access point device. Based on the time measurement and the bias suppression data, the UE locator system estimates the location of the UE device. Corresponding methods and systems are also disclosed.

20 Claims, 11 Drawing Sheets

(56) References Cited

OTHER PUBLICATIONS

Guo, et al., "Indoor Smartphone Localization: A Hybrid WiFi RTT-RSS Ranging Approach, IEEEAccess", Open Access Journal. State Key Laboratory of Information Engineering in Surveying, Mapping and Remote Sensing (LIESMARS), Wuhan University, Wuhan 430079, China. vol. 7, 2019, Dec. 5, 2019.

Huilla, et al.,"Smartphone-based Indoor Positioning Using Wi-Fi Fine Timing Measurement Protocol", Master of Science Thesis, University of Turku, Department of Future Technologies Communication Systems. Sep. 2019.

Ibrahim, et al.,"Verification: Accuracy Evaluation of WiFi Fine Time Measurements on an Open Platform", Session: Where are U Now? Localization and Motion Tracking, MobiCom'18, Oct. 29-Nov. 2, 2018, New Delhi, India, WINLAB, Rutgers University, General Motors Research.

\* cited by examiner

Bias Suppression Datastore 1000-A

| Location 1 ($X_1, Y_1$) | Location 2 ($X_2, Y_2$) |
|---|---|
| App. dist. AP-1 | App. dist. AP-1 |
| App. dist. AP-2 | App. dist. AP-2 |
| App. dist. AP-3 | App. dist. AP-3 |

| Location 3 ($X_3, Y_3$) | Location 4 ($X_4, Y_4$) |
|---|---|
| App. dist. AP-1 | App. dist. AP-1 |
| App. dist. AP-2 | App. dist. AP-2 |
| App. dist. AP-3 | App. dist. AP-3 |

| Location 5 ($X_5, Y_5$) | Location 6 ($X_6, Y_6$) |
|---|---|
| App. dist. AP-1 | App. dist. AP-1 |
| App. dist. AP-2 | App. dist. AP-2 |
| App. dist. AP-3 | App. dist. AP-3 |

Bias Suppression Datastore 1000-B

| Location 1 ($X_1, Y_1$) | Location 2 ($X_2, Y_2$) |
|---|---|
| Dist. Bias AP-1 | Dist. Bias AP-1 |
| Dist. Bias AP-2 | Dist. Bias AP-2 |
| Dist. Bias AP-3 | Dist. Bias AP-3 |

| Location 3 ($X_3, Y_3$) | Location 4 ($X_4, Y_4$) |
|---|---|
| Dist. Bias AP-1 | Dist. Bias AP-1 |
| Dist. Bias AP-2 | Dist. Bias AP-2 |
| Dist. Bias AP-3 | Dist. Bias AP-3 |

| Location 5 ($X_5, Y_5$) | Location 6 ($X_6, Y_6$) |
|---|---|
| Dist. Bias AP-1 | Dist. Bias AP-1 |
| Dist. Bias AP-2 | Dist. Bias AP-2 |
| Dist. Bias AP-3 | Dist. Bias AP-3 |

METHODS AND SYSTEMS FOR LOCATING A USER EQUIPMENT DEVICE BASED ON SIGNAL TRAVEL TIME AND BIAS SUPPRESSION

BACKGROUND INFORMATION

Various satellite-based and other positioning systems are used every day to assist users and computing applications in navigating and productively interacting with the world in location-based ways. For example, Global Navigation Satellite Systems (GNSS) such as the Global Positioning System (GPS) are commonly relied on to provide geolocation services in the United States and in many other countries. To a large extent, these systems are designed to determine the geolocation for devices that are outdoors or otherwise have relatively direct line of sight with satellites (e.g., without layers of thick concrete between devices and the satellites, etc.). As such, these systems are not generally reliable for indoor positioning applications, especially at a level of accuracy that would be necessary or desirable for many indoor positioning applications.

For example, indoor positioning applications for which conventional outdoor positioning systems may be inadequate include, among others, indoor navigation (e.g., to provide step-by-step instructions to a particular conference room in a large office, to a particular store in a large mall, etc.), location tracking for analyzing resource utilization (e.g., to determine which rooms are being used, where cleaning efforts should focus at the end of the day, etc.), location tracking for individuals (e.g., to quickly locate particular coworkers in a large office, to keep tabs on children in a large store or mall, etc.), hybrid in-office/remote work support (e.g., indicating who is working in the office on a particular day, etc.), and so forth.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 10A and 10B show illustrative bias suppression datastores used to facilitate locating a UE device based on signal travel time and bias suppression in accordance with principles described herein.

DETAILED DESCRIPTION OF EXAMPLE EMBODIMENTS

Figure 1:
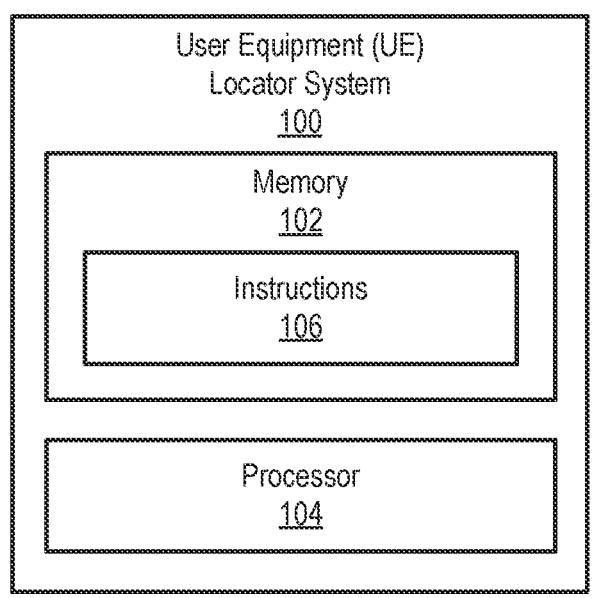
FIG. 1 shows an illustrative user equipment (UE) locator system configured to locate a UE device based on signal travel time and bias suppression in accordance with principles described herein.

Methods and systems for locating a user equipment (UE) device based on signal travel time and bias suppression are described herein. As mentioned above, while well-established positioning systems are functional under many conditions and circumstances, other conditions and circumstances (e.g., being indoors or otherwise dissociated from satellite signaling, requiring a higher level of accuracy than established positioning systems can provide, etc.) may be better served by alternative positioning systems that build on or replace conventional positional principles with novel principles described herein.

One alternative positioning technique involves signaling from terrestrial sources (e.g., indoor wireless access points for a wireless network, outdoor cell towers, etc.). If a distance of a device can be determined with respect to several such terrestrial signal sources, multilateration techniques may be employed to determine an accurate location of the device. As one example, time measurements between a UE device and several different access point devices (or other sources of terrestrial signaling) at known locations may be converted to distances that reveal a specific location where the device must be located based on those distances. As another example, a database of signal strength measurements produced in known, pre-calibrated locations may be used to reveal where a device is likely to be given a particular signal strength fingerprint (i.e., combination of signal strength measurements for different access points).

Both this timing-based multilateration approach and this signal-strength-based fingerprint database approach are associated with certain challenges, and both leave room for improvement. First, converting precise time measurements to distances requires that assumptions be made about the signal travel path that timing signaling traverses between the device and the access point, and these assumptions may be both incorrect and difficult to correct for. For instance, if a UE device has a direct line of sight with an access point device, the signal travel path traversed by exchanged signals (e.g., signals used to perform the time measurements) may be different than if the signals reflect from one or more object surfaces (e.g., walls, floors, ceilings, etc.) during the time measurement communications. What's more, it may be difficult to differentiate and account for potential line-of-sight (LOS) and non-line-of-sight (NLoS) signal travel paths since multiple paths may potentially be taken by the same signal for a given time measurement.

Using signal-strength fingerprints may help avoid problems in the areas where timing-based multilateration approaches suffer from NLoS travel paths, but signal-strength-based approaches may present their own challenges. For instance, the location may not be resolvable reliably and granularly since the signal-to-noise ratio for the detected signal strength may not be as good as the signal-to-noise ratio for signal characteristics like travel time.

Methods and systems described herein for locating a UE device based on signal travel time and bias suppression provide an alternative positioning technique that addresses the challenges described above so as to be highly accurate, precise, reliable, and equally suitable for indoor and outdoor use. Specifically, methods and systems will be described and illustrated that leverage both: 1) the superior accuracy and granularity of signal travel time measurements (rather than detections of signal strength), and 2) compensation for bias resulting from unknown or unpredictable LoS and/or NLoS signal travel paths (provided by pre-calibrated "fingerprint"-like measurements stored in a bias suppression datastore).

Methods and systems described herein for locating a UE device based on signal travel time and bias suppression data accessed from a bias suppression datastore (e.g., a collection of data analogous to a fingerprint database in the signal-strength-based approaches described above) may improve positioning by suppressing position-dependent disturbances (e.g., NLoS reflections that are difficult to predict but may be measured and assessed as part of a calibration procedure), As such, the positioning techniques enabled by methods and systems described herein may improve conventional timing-based (e.g., satellite-based, WiFi-based, Bluetooth-based, 5G-based, etc.) positioning systems to improve geolocation services in difficult areas (e.g., indoor areas, outdoor areas where canyon walls or tall buildings may block and reflect satellite signaling, etc.) or be used as an alternative to such conventional systems.

Other benefits of methods and systems described herein include flexibility in the ways these methods and systems may be implemented and deployed, as well as various features that these methods and systems may support. As one example of deployment flexibility, time measurements used as a basis for locating a UE device may leverage any of various protocols, technologies, or techniques for quantifying the travel time between a particular UE device and a particular access point device. For instance, time measurements described herein may be based on round-trip-time (ITT) measurements, time-of-flight (ToF) measurements, time-of-arrival (ToA) measurements, time-difference-of-arrival (TDoA) measurements, or any other suitable time measurements as may serve a particular implementation.

As another example of deployment flexibility, bias suppression data stored in and accessed from the bias suppression datastore may be determined, catalogued, stored, accessed, and used in a variety of different ways as may serve different particular implementation. For instance, in certain implementations the bias suppression datastore may include bias suppression data that has been determined as part of a calibration procedure performed prior to the accessing of the bias suppression data, while in other implementations the bias suppression datastore may include bias suppression data that has been determined (and may continue to be updated) by way of a crowd-sourced learning procedure, A great deal of flexibility is also present in what data is stored in the bias suppression datastore. For example, a statistical distribution of measurements at a calibration location may be represented in the bias suppression data with as little as a mean and/or a standard deviation for the statistical distribution, or with as detailed a description of the statistical distribution (e.g., a multi-gaussian description, a histogram-based description, etc.) as may serve a particular implementation.

Moreover, bias suppression data used by methods and systems described herein may be configured for use in suppressing an influence of a bias (e.g., a bias between an apparent distance suggested by a time measurement, which may or may not be correct depending on whether a LoS signal travel path is in use, and a true distance) in different ways to provide different advantages and tradeoffs for different implementations.

For instance, in certain implementations, the bias suppression data may be configured to facilitate suppression of the influence of the bias by representing the statistical distribution as it is expected to be detected from a particular calibration location (e.g., indicating the apparent distance that will be measured regardless of whether that apparent distance is the true LoS distance or a NLoS distance). This approach may be referred to as a "pure fingerprint-based" approach and may be beneficial to the extent that it does not require any system knowledge of where access point devices are actually located, just how far away they should appear to be located from each calibration location. The tradeoff of this approach would be that it may only be operational or reliable in pre-calibrated areas.

Conversely, in other implementations where information about the access point locations is available, the bias suppression data may be configured to facilitate suppression of the influence of the bias by representing the statistical distribution not of the actual distances traversed by signals during the time measurements, but of the additional distances traversed above and beyond the known true distance (i.e., the distance bias beyond the true distance). This approach may be referred to as a "hybrid fingerprint-based" approach and, while having the potential downside of requiring the access point location information, may be advantageous in that it may remain operational and relatively reliable (albeit less accurate) for UE device positioning outside of pre-calibrated areas. This is because default bias suppression data indicating that there is no known bias may be employed outside of pre-calibrated areas and rougher estimations of device location can still be made based on the known access point locations.

Based on these and various other principles and techniques described herein, methods and systems for locating a UE device based on signal travel time and bias suppression may provide superior positioning performance in various environments (e.g., including indoor and other conventionally difficult environments) at least because NLoS effects on time measurements are compensated for in a robust way using the bias suppression data.

Various specific implementations will now be described in detail with reference to the figures. It will be understood that the specific implementations described below are provided as non-limiting examples and may be applied in various situations. Additionally, it will be understood that other examples not explicitly described herein may also be captured by the scope of the claims set forth below. Methods and systems described herein for locating a UE device based on signal travel time and bias suppression may provide any of the benefits mentioned above, as well as various additional and/or alternative benefits that will be described and/or made apparent below.

FIG. 1 shows an illustrative UE locator system 100 ("system 100") configured to locate a UE device based on signal travel time and bias suppression in accordance with principles described herein. System 100 may be implemented by computer resources such as processors, memory facilities, storage facilities, communication interfaces, and so forth. For instance, system 100 may be partially or fully implemented by off-site multi-access server systems remote from UE devices whose locations are to be determined, dedicated on-site server systems proximate to the UE devices, access point devices communicating with the UE devices, the UE devices themselves, and/or any other suitable computing systems or combinations thereof. In various implementations, at least part of system 100 may be implemented by distributed computing systems operated by a cellular data provider (e.g., multi-access edge compute (MEC) systems), by distributed computing systems operated by a cloud-computing provider (e.g., mufti-access cloud compute systems), or by computing devices used by end users (e.g., UE devices such as smartphones, tablet devices, personal computers, or other mobile equipment used directly by end users).

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner, Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with locating a UE device based on signal travel time and bias suppression in accordance with methods and systems described herein and/or as may serve a particular implementation.

Figure 2:
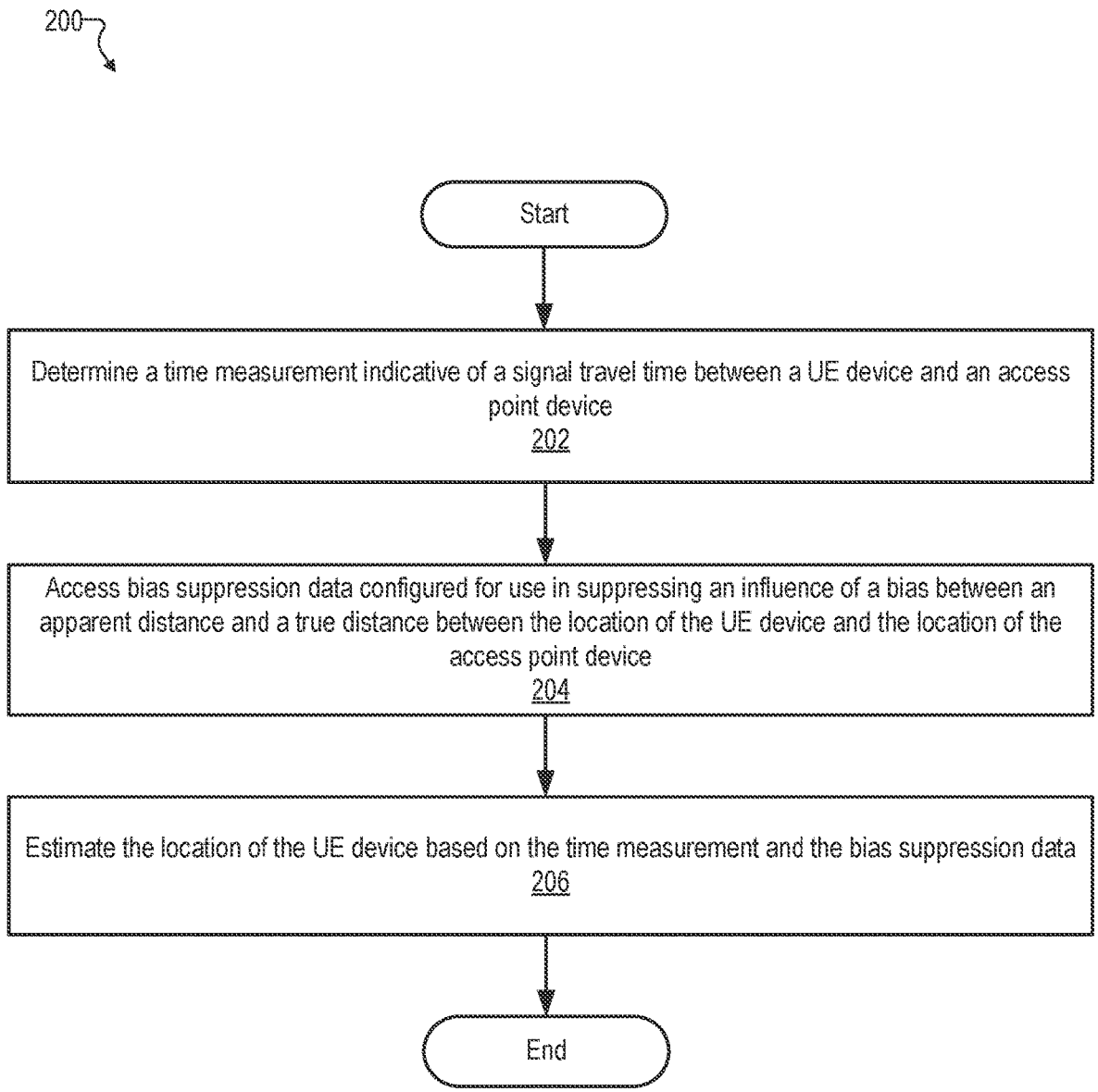
FIG. 2 shows an illustrative method for locating a UE device based on signal travel time and bias suppression in accordance with principles described herein.

To illustrate certain functionality that processor 104 may perform, FIG. 2 shows an illustrative method 200 for locating a UE device based on signal travel time and bias suppression in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a UE locator system such as system 100 and/or any implementation thereof.

In some examples, the operations of FIG. 2 may be performed in real time to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they, exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by an implementation of system 100 (e.g., by processor 104 executing instructions 106 stored in memory 102).

At operation 202, system 100 may determine a time measurement indicative of a signal travel time between a UE device and an access point device. For example, the time measurement may be a round-trip time measured from the UE device to the access point device and back, a round-trip time measured from the access point device to the UE device and back, a one-way transit time measured in either direction between the UE device and the access point device, or any other type of time measurement associated with any other protocol or technology described herein. In certain implementations, the UE device and/or the access point device may be specially configured to utilize a protocol such as the round-trip time protocol of the IEEE 802.11mc standard ("Wi-Fi RTT") or another hardware-enhanced or software-enhanced protocol configured to ensure highly accurate time measurements. Because signaling travels between devices at a known speed (i.e., the speed of light for radio signals), these and/or other types of signal travel times indicated by a time measurement may be closely associated with, or readily converted to, distances that the signals travel. As will be described and illustrated in more detail, these distances may be direct distances (for LoS signaling) or longer distances involving one or more bounces (for NLoS signaling). As a result of this direct relationship between signal travel time and distance (i.e., signal travel path length), these concepts may be described herein in a way that presumes an analogousness of signal travel times and distances that signals travel on signal travel paths associated with those signal travel times.

The UE device may be a smartphone or other portable device that the system is configured to locate or track, and the access point device may be a wireless router or other suitable access point device configured, as part of a collection of such devices, to provide a wireless local area network for a particular area. For instance, the area for which the wireless local area network is provided may be an indoor space such as an office space (e.g., one or more floors of an office building), a shopping area (e.g., a mall or department store), a hotel, a convention center, a restaurant, or another indoor space in which a wireless local area network is provided across the space. In other examples, the area for which the wireless local area network is provided may be an outdoor space such as an outdoor shopping area (e.g., an outlet mall, a car dealership, etc.), an outdoor event venue (e.g., state or county fairgrounds, an amusement park, etc.), or another such space. In the event that the indoor or outdoor space is also amenable to other types of positioning, it will be understood that positioning techniques described herein may be used instead of or in combination with conventional positioning techniques (e.g., as a corrective measure, a backup technique, etc.).

The signal travel time indicated by the time measurement determined at operation 202 may correspond to an apparent distance, presuming an LoS signal travel path, between a location of the UE device and a location of the access point device. As such, in the event that a clear LoS signal travel path exists between the UE device and the access point device, the apparent distance to which the time measurement corresponds may be equal or very close to a true distance between the UE device and the access point device. Conversely, in the event that the primary path between the UE device and the access point device is a NLoS signal travel path, the apparent distance to which the time measurement corresponds may be at least somewhat further (and possibly a good deal further) than the true distance due to a bias associated with the NLoS signal travel path between the UE device and the access point device (i.e., reflecting the longer distance that the signaling must travel to bounce off surfaces, etc.). Regardless of how similar or different the apparent distance indicated by the time measurement is to the true distance between the UE device and the access point device, system 100 may be configured to account for this bias based on bias suppression data from a bias suppression datastore.

To this end, at operation 204, system 100 may access bias suppression data from the bias suppression datastore. As mentioned, the bias suppression data may be configured for use in suppressing an influence of the bias between the apparent distance and the true distance between the location of the UE device and the location of the access point device in various ways. For example, given that the bias may be associated with (e.g., at least partially arise from) the NLoS signal travel path between the UE device and the access point device, the bias suppression data may represent the apparent distance that would be expected to be measured from calibration locations (e.g., so that this may be compared to the apparent distance detected by way of the time measurement of operation 202), the difference between the apparent distance that would be expected and the true distance of pre-calibrated locations (e.g., so that this may be used as a corrective measure to derive the true distance), a combination of these, or any other suitable bias suppression value as may serve a particular implementation.

At operation 206, system 100 may estimate the location of the UE device based on the time measurement determined at operation 202 and the bias suppression data accessed at operation 204. For example, the time measurement may be used to determine the apparent distance, which the bias suppression data may be used to correct (e.g., to account for NLoS-related bias) to determine the true distance such that multilateration techniques may be employed to estimate the UE device location based on the true distance. As another example, the time measurement may be used to determine the apparent distance, which may then be compared to the bias suppression data to determine the most likely location of the UE device in light of pre-calibration data that has been collected and which pre-calibrated locations are most similar to the apparent distance that has been measured and determined.

While method 200 has been described in relation to a single access point device and its apparent/true distance from the UE device, it will be understood that method 200 may produce the most accurate results when the method is performed with respect to a plurality of different access point devices from which the UE device location can be computed using multilateration. As such, along with the determining of the time measurement at operation 202, system 100 may further determine one or more additional time measurements indicative of one or more additional signal travel times between the UE device and one or more additional access point devices. Bias suppression data for each of these additional access point devices may be accessed at operation 204 and the estimating at operation 206 of the location of the UE device may then be further based on the one or more additional time measurements and the additional bias suppression data for the other access point devices.

Figure 3:
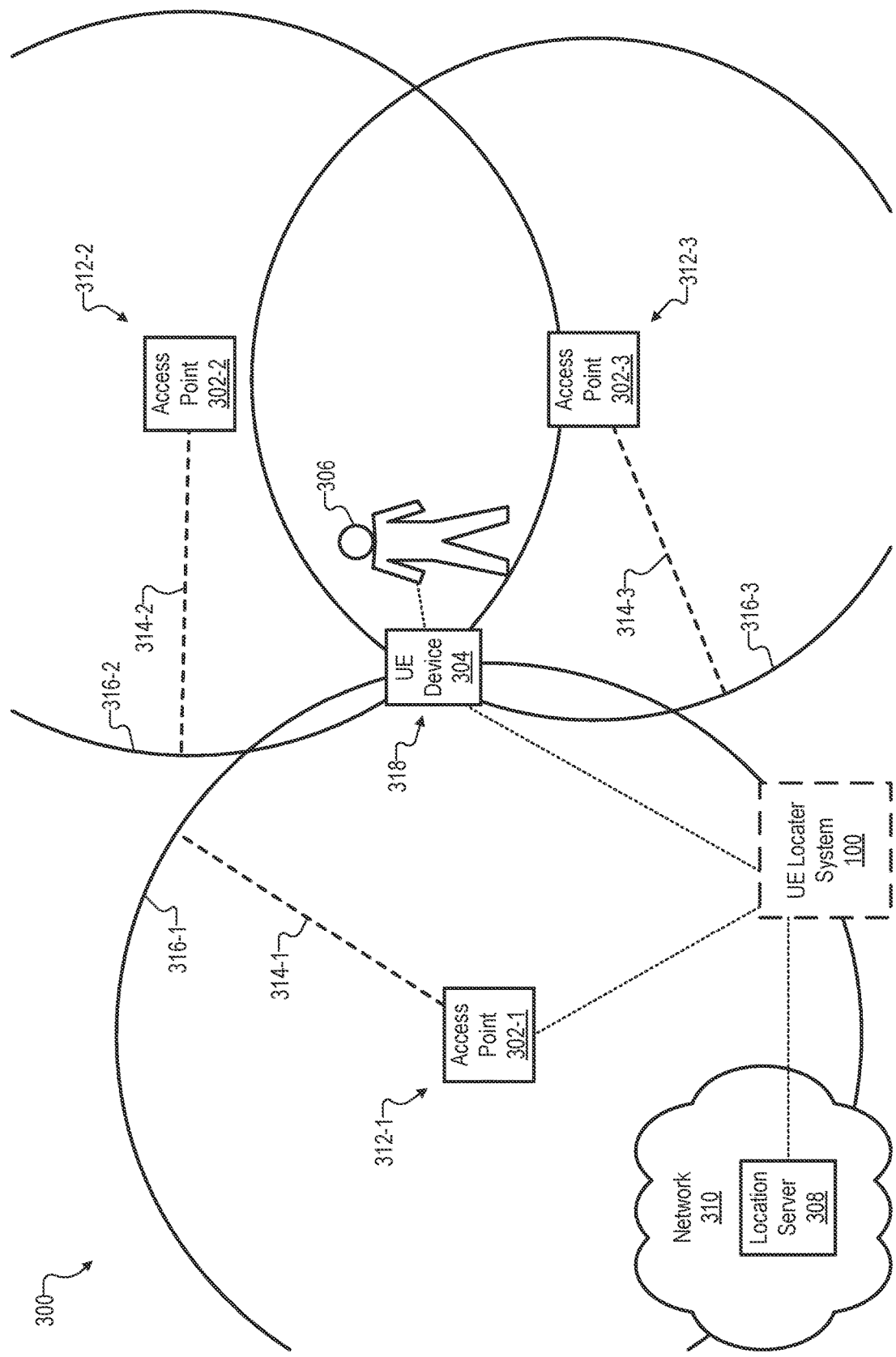
FIG. 3 shows an illustrative environment in which the UE locator system of FIG. 1 may operate in accordance with principles described herein.

FIG. 3 shows an illustrative environment 300 in which system 100 may operate in accordance with principles described herein. Environment 300 is shown to include a plurality of access point devices 302 (labeled as access points 302-1 through 302-3), a UE device 304 associated with (e.g., carried by, operated by, used by, etc.) a user 306, and a location server 308 associated with a network 310. As indicated by thin dotted lines extending from system 100 to each of access point device 302-1, UE device 304, and location server 308, any combination of these systems or devices may be used to implement system 100. In other words, the computing resources implementing system 100 (e.g., resources described above to be associated with memory 102, processor 104, etc.) may be included in any one of the computing systems or devices shown in FIG. 3, or may be distributed across any combination of these computing systems or devices in any manner as may serve a particular implementation. While, in an effort to limit clutter in the drawing, a dotted line is only explicitly shown between system 100 and one access point device (i.e., access point device 302-1), it will be understood that other access point devices 302 may also partially or fully implement system 100 (e.g., alone or in combination with other computing devices). System 100 and some illustrative functionality it may perform were described above in relation to FIGS. 1 and 2. Each of the other elements illustrated in FIG. 3 will now be described in more detail.

Environment 300 may represent any indoor or outdoor space within which access point device such as access point devices 302 are located (e.g., statically located at fixed places within the environment). As has been mentioned, an environment in which conventional positioning systems are limited (e.g., indoor locations in which concrete and other construction materials may effectively block satellite signaling, etc.) may be a prime environment for methods and systems described herein to be deployed. However, it will be understood that other environments (e.g., outdoor environments in which conventional positioning systems work fine) may also benefit from the accuracy of these methods and systems (e.g., as an alternative, enhancement, backup, or add-on to conventional approaches). As will be described in more detail below, environments containing access point devices such as environment 300 may be analyzed by way of calibration procedures. For example, various calibration locations in and around environment 300 may be tested to analyze a "fingerprint" of how timing measurements between UE device 304 and each of access point devices 302 may be expected to appear, and this calibration data may be stored as bias suppression data in a bias suppression datastore such as will be described and illustrated in more detail below.

As shown in FIG. 3, various access point devices 302 may be distributed to various locations 312 within environment 300, Specifically, access point device 302-1 is shown to be disposed at a first location 312-1, while access point devices 302-2 and 302-3 are shown to be distributed to other parts of environment 300 at locations 312-2 and 312-3, respectively. If the various locations 312 are known and a respective distance 314 that UE device 304 is from each access point device 302 can be accurately determined, the location of UE device 304 may be derived using multilateration. More particularly, by determining that there is a distance 314-1 between UE device 304 and access point device 302-1 (as illustrated by a circle 316-1 centered at access point device 302-1 and having a radius of distance 314-1), that there is a distance 314-2 between UE device 304 and access point device 302-2 (as illustrated by a circle 316-2 centered at access point device 302-2 and having a radius of distance 314-2), and that there is a distance 314-3 between UE device 304 and access point device 302-3 (as illustrated by a circle 316-3 centered at access point device 302-3 and having a radius of distance 314-3), a location 318 of UE device 304 may be determined by multilateration techniques.

The challenge, as has been mentioned and as will be described and illustrated in more detail below, is to accurately determine these distances 314. Even if time measurements can be used to accurately determine the length of a signal travel path (i.e., the distance that signals travel between UE device 304 and a given access point device), it may be difficult or impossible to decisively distinguish between time measurements for LoS signal travel paths (which directly correspond to distances 314) and NLoS signal travel paths or other signal travel paths that are subject to diffraction, multipath, and/or other unpredictable and varying disturbances (which indirectly correspond to distances 314 but introduce bias that can lead to estimation errors for the device location if not adequately accounted for).

Access point devices 302 may represent any type of access point such as a WiFi router or signal booster; a provider network node (e.g., a radio tower, etc.); a node of a security system or home automation system; an artificial intelligence assistance device in a network of such devices placed around a home or office; or any other suitable network access point or other computing device distributed throughout an environment and with which the UE device may communicate to enable positioning services. In some examples, access point devices 302 may be portable (e.g., typically stationary but able to be moved on occasion) or even mobile, whereas in other examples access point devices 302 are statically and permanently disposed at fixed locations (e.g., permanently installed at respective locations 312).

To facilitate time measurements described herein (e.g., measurements of signal travel time between an access point device 302 and UE device 304), access point device 302 may include special hardware and/or software configured to implement time measurement protocols or standards that are designed to facilitate accurate time measurements (e.g., by helping to distinguish signal travel time from signal processing time, etc.). For example, in the standard of the Wi-Fi protocol, IEEE 802.11mc (Wi-Fi RTT) may be used to generate an accurate approximation of the distance between the UE device 304 and a particular access point device 302 by using the Fine Timing Measurement (FTM) protocol. In other examples, other timing or synchronization protocols (e.g., IEEE 1588 Precision Time Protocol (PTP), 5G timing protocols, GNSS timing protocols, etc.) may also or alternatively be employed. Using these types of resources, time measurements determined by system 100 between an access point device 302 and UE device 304 may include a round-trip time (RTT) measurement for a signal communicated from UE device 304 to the access point device 302 or for a signal communicated from the access point device 302 to UE device 304. In other implementations, time measurements determined by system 100 may be a time-of-flight (ToF) measurement for a signal communicated from UE device 304 to the access point device 302 or for a signal communicated from the access point device 302 to UE device 304; a time-of-arrival (ToA) measurement for a signal received by UE device 304 from the access point device 302 or for a signal received by the access point device 302 from UE device 304; a time-difference-of-arrival (TDoA) measurement between signals received by UE device 304 from one access point device 302 (e.g., access point device 302-1) and from a different access point device 302 (e.g., access point device 302-2); and/or any other timing-based radio technology or protocol as may serve a particular implementation.

UE device 304 may represent any mobile device configured to communicate with access point devices 302 in a manner that allows for the time measurements to be determined and, ultimately, for location 308 of UE device 304 to be derived therefrom. For example, UE device 304 may be implemented as a consumer computing device such as a mobile device (e.g., a smartphone, a tablet computing device, etc.), an extended reality (XR) presentation device (e.g., a head-mounted virtual reality (VR) or augmented reality (AR) device configured to display graphics directly in front of each eye of the user), a portable computing device (e.g., a personal laptop computer, etc.), or any other system or device as may serve a particular implementation. In some implementations, UE device 304 may include special hardware and/or software for enabling or accelerating time measurement protocols such as those described above (e.g., Wi-Fi RTT, FTM, PTP, etc.).

Location server 308 is an optional component that may be utilized for implementations of system 100 that, for various reasons, are not fully contained within UE device 304, access point devices 302, or a combination of these. For instance, location server 308 may be implemented by a local computing system on a local area network (e.g., a Wi-Fi network) provided by access point devices 302. As another example, location server 308 may be implemented by a more remote computing system such as a multi-access compute (MEC) system or cloud-based multi-access computing system located off-site (e.g., at least somewhat apart from environment 300). As shown, location server 308 may be accessible by way of network 310, which, while only explicitly shown to incorporate or provide communication for location server 308, will be understood to provide a communication fabric for many or all of the computing systems and devices in FIG. 3 in certain implementations.

To this end, network 310 may be implemented by any suitable private or public networks as may serve a particular implementation. For instance, part of network 310 may be implemented by a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). The provider of such a provider network may own or control all of the elements necessary to sell and deliver communications services between location server 308 and other computing systems and devices such as access point devices 302, UE device 304, and/or any other system or device within which system 100 is implemented. Such communications services may include radio spectrum allocation, wireless network infrastructure, back haul infrastructure, provisioning of devices, network repair, and so forth.

In some examples, other networks not controlled by the provider may also be included within network 310. For example, external network infrastructure may include the Internet, one or more wide area networks or local area networks to which the illustrated computing systems are connected, a content delivery network, and/or any other suitable network or networks managed by any third parties outside of the control of the provider of the provider system described above. The network elements associated with network 310 may implement or employ any suitable communication technologies, devices, media, protocols, or the like as may serve a particular implementation. In certain examples, location server 308 may be implemented by a MEC system incorporated into a provider network, by multi-access cloud compute systems, and/or by other distributed computing resources as may be incorporated into or communicatively coupled with network 310 in a particular implementation.

As has been mentioned, multilateration techniques may be employed to determine, reliably and accurately once each distance 314 from UE device 304 to the various access point devices 302 is known, the location 318 of UE device 304. Unfortunately, various disturbances (e.g., NLoS signal travel paths, mufti-path communications, signal diffraction, unavoidable noise introduced into the computing systems and/or measurement equipment, etc.) may introduce bias and noise into the distance detection process, thereby making it difficult to accurately determine these distances 314, particularly in complex indoor environments that include walls and various objects that reflect, absorb, and distort timing signals in various ways.

Figure 4:
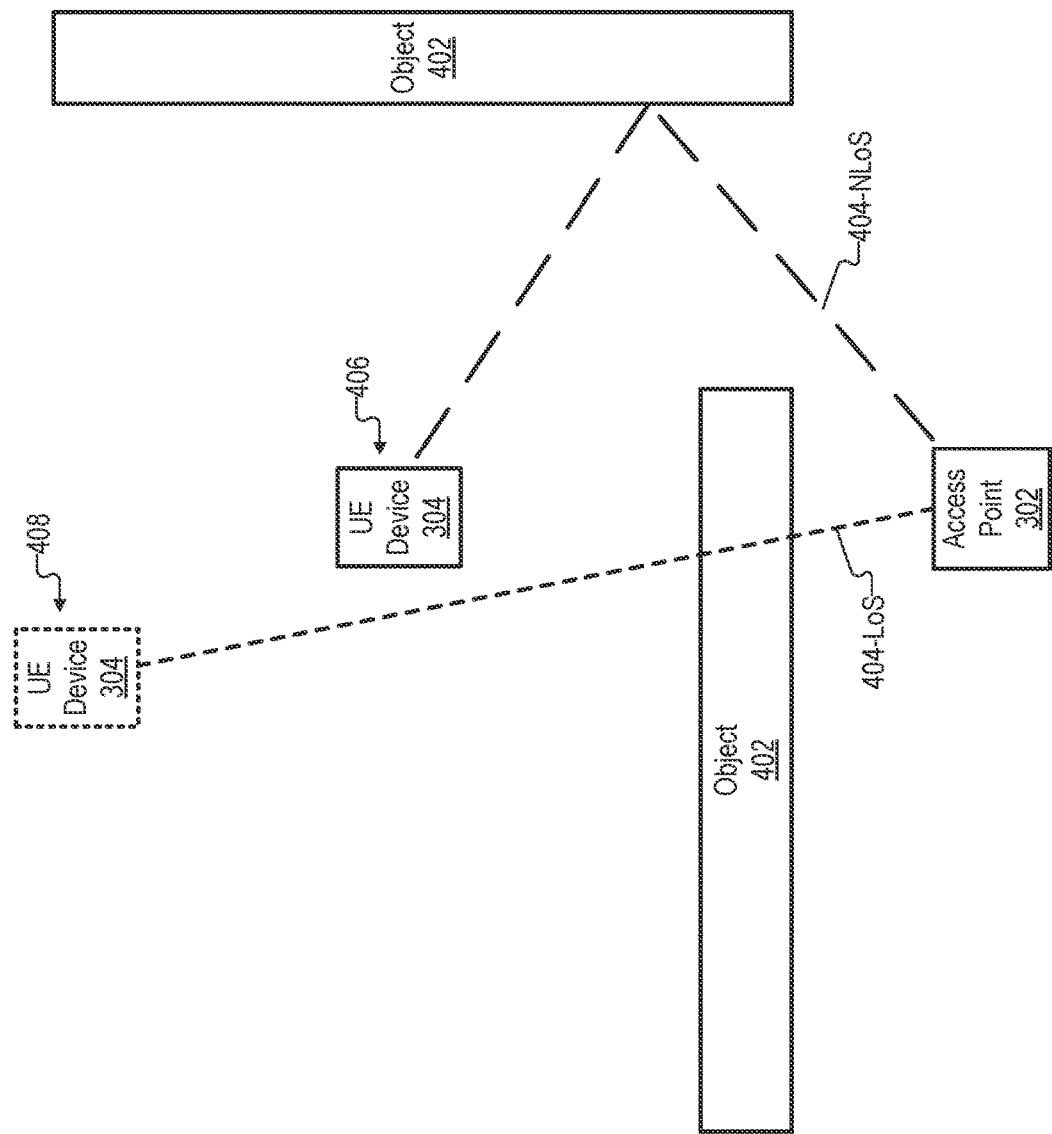
FIG. 4 shows illustrative aspects of how a measurement bias may arise when measuring a distance between a UE device and an access point device in accordance with principles described herein.

To illustrate, FIG. 4 shows certain aspects of how a measurement bias may arise when measuring a distance between UE device 304 and a particular access point device 302 (representing any of access point devices 302-1 through 302-3). As shown in FIG. 4, the environment 300 in which the access point devices and UE device are located may include objects 402 that exert some influence on timing signal propagation. For instance, objects 402 may represent walls that are constructed of materials that at least partially reflect signaling communicated between UE device 304 and access point device 302 for the time measurement. As a result of this ability of object 402 to reflect the timing signaling, FIG. 4 shows how an apparent distance between UE device 304 and access point device 302 based on a time measurement may be different from an actual distance. Specifically, if it is presupposed that a timing measurement is made using an LoS signal travel path 404-LoS while reflections from objects 402 cause the timing signals to actually travel by way of a NLoS signal travel path 404-NLoS, a bias (e.g., a significant difference) may be introduced between an actual location 406 of UE device 304 and an apparent location 408 of UE device 304. This is because both signal travel paths 404-LoS and 404-NLoS may be the same length (i.e., it would take the same amount of time for a signal to travel from access point device 302 to location 408 via direct path 404-LoS as it would to travel from access point device 302 to location 406 via indirect path 404-NLoS), and without an understanding of the geometry of objects 402 and without yet knowing the locations of the devices, it is not possible for system 100 to anticipate that path 404-NLoS will be traversed rather than path 404-LoS.

To further complicate matters, certain environments may not only include objects 402 that reflect signals to create the challenges illustrated in FIG. 4, but may introduce even more complex scenarios in which signals are only partially reflected (e.g., so that some signal energy travels by way of LoS signal travel path 402-LoS) and/or signals have multiple NLoS signal travel paths that they can take between access point device 302 and UE device 304. In these scenarios as well, determining an accurate time measurement is insufficient on its own to reveal the actual distance between the devices (and, when combined with other actual distances by way of multilateration, the actual location of the UE device) because it is unknown which path the signal for a particular time measurement traversed.

Figure 5:
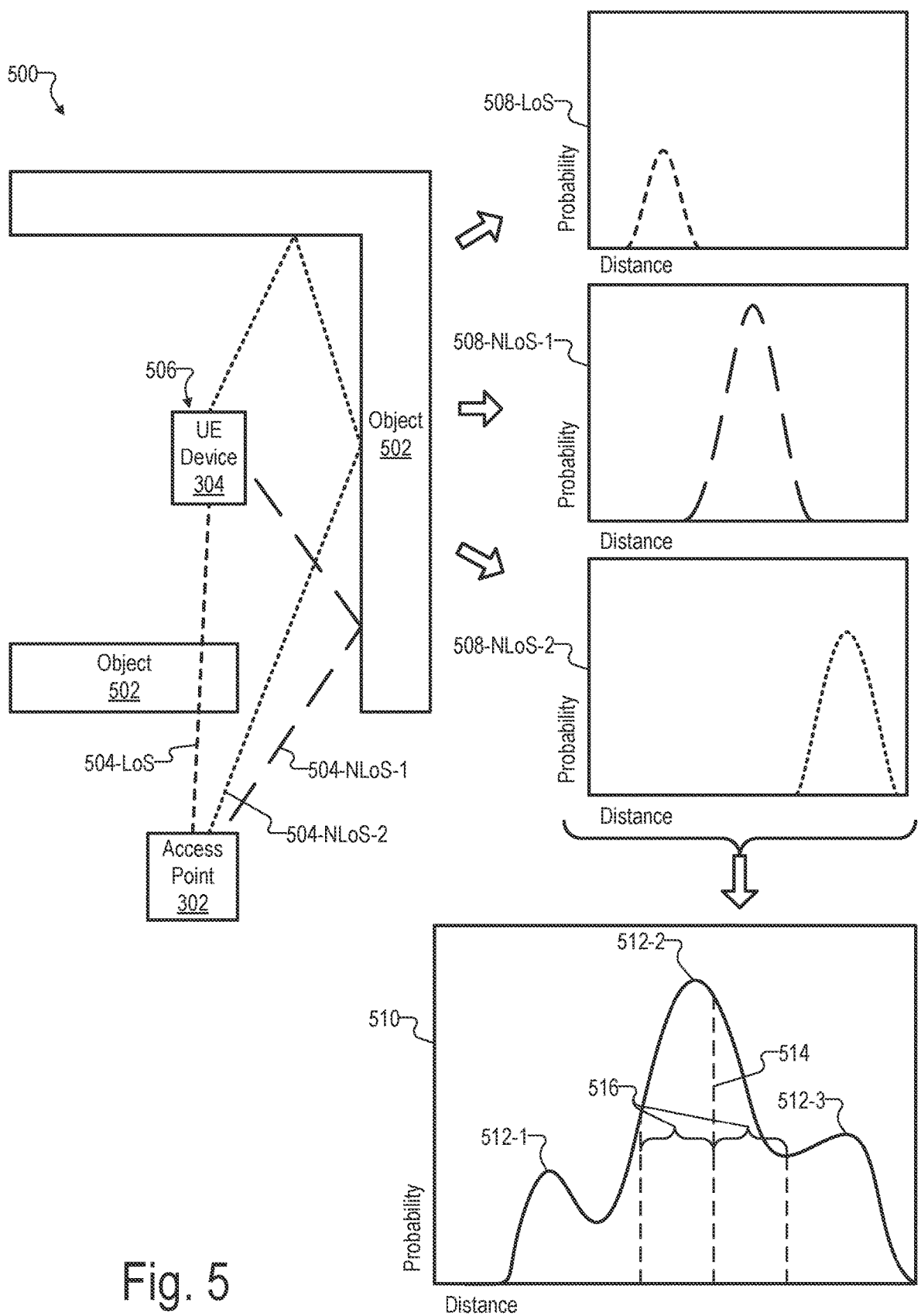
FIG. 5 shows illustrative aspects of how measurement bias may manifest in scenarios involving multiple signal travel paths between a UE device and an access point device in accordance with principles described herein.

To illustrate such a scenario, FIG. 5 shows illustrative aspects of how measurement bias may manifest in a scenario 500 involving multiple signal travel paths between UE device 304 and access point device 302. As shown, scenario 500 includes various objects 502 that, like object 402 described above, may influence time signaling in ways that are difficult to predict and account for. For example, objects 502 may represent walls within an indoor space. The example shown in FIG. 5 illustrates three different signal travel paths 504 that timing signals may traverse between access point device 302 and a location 506 where UE device 304 is disposed (as has been mentioned, it will be understood in each of these examples that signaling may travel these paths in either direction, or in both directions for the RTT case). Specifically, a LoS signal travel path 504-LoS is shown to be a direct path right through an object 502 (e.g., for an object that does not reflect or absorb all of the signal energy), a first NLoS signal travel path 504-NLoS-1 is shown to be an indirect path with one reflection from an object 502 (similar to path 404-NLoS described above), and a second NLoS signal travel path 504-NLoS-2 is shown to be an indirect path with two reflections from objects 502, making it an even longer path than path 504-NLoS-1.

Next to scenario 500 in FIG. 5, three probability distribution curves 508 are shown to illustrate the respective probability distributions of the detected distance for each path 504 (i.e., signal travel paths 504-LoS, 504-NLoS-1, and 504-NLoS-2). Specifically, a probability distribution curve 508-LoS shows that the relatively short distance detected for time measurements utilizing signal travel path 504-LoS has a gaussian (normal) shape with a mean dose to the actual distance between access point device 302 and UE device 304 and tails that fall away on either side due to measurement noise. Similarly, a probability distribution curve 508-NLoS-1 shows that the medium distance detected for time measurements utilizing signal travel path 504-NLoS-1 has a gaussian shape with a mean of the distance between access point device 302 and UE device 304 via the one reflection.

Finally, a similar probability distribution curve 508-NLoS-2 shows that the relatively long distance detected for time measurements utilizing signal travel path 504-NLoS-2 has a similar gaussian shape with a mean of the distance between access point device 302 and UE device 304 via the two reflections.

Combining probability distribution curves 508, a statistical distribution 510 of distance measurements derived from signal travel time between access point device 302 and UE device 304 is shown in the bottom right portion of FIG. 5. In statistical distribution 510, three peaks 512 align with the means of probability distribution curves 508 (e.g., peak 512-1 aligning with the average of probability distribution curve 508-LoS, peak 512-2 aligning with the average of probability distribution curve 508-NLoS-1, and peak 512-3 aligning with the average of probability distribution curve 508-NLoS-2). Additionally, an average 514 and a standard deviation 516 of statistical distribution 510 may also be determined. In this example, average 514 is near, but not identical to peak 512-2, thereby providing a fair representation of the most likely path to be traversed (La, signal travel path 504-NLoS-2). The width of standard deviation 516 represents how likely other measurements may be to deviate from this average.

Given the complexities of NLoS and multipath communication encountered when making time measurements in scenarios such as illustrated in FIGS. 4 and 5, it has been demonstrated that a determined location of a UE device may be inaccurate and/or imprecise if multilateration calculations are performed with an assumption of single-path, LoS time measurements. As has been shown, however, the complexities that arise from unpredictable multipath communication for a particular geometry (e.g., with UE device 304 positioned at location 506 with respect to stationary objects 502 and access point devices 302) may be measured, analyzed, and represented to an arbitrary degree of detail and accuracy using a statistical distribution such as statistical distribution 510. Effectively, statistical distribution 510 may represent the probability distribution for how these complexities may be expected to play out when distance is detected for scenario 500 (i.e., for the locations and geometric relationships of access point device 302, UE device 304, and objects 502). Accordingly, by determining and storing data representative of such statistical distribution for various locations and geometries of the devices (e.g., for various possible locations where UE device 304 may be located with respect to a fixed geometry of access point device 302 and objects 502), methods and systems described herein may account for real-world bias that may be introduced regardless of how complex the geometry may be (e.g., regardless of how many signal travel paths may be present, etc.).

Data representing the probability distribution of the distance expected to be measured for a given geometry (e.g., the geometry of scenario 500 illustrated in FIG. 5 with UE device 304 at location 506, etc.) may be referred to herein as bias suppression data, and may be collected, organized, and stored in a database or other suitable data structure referred to herein as a bias suppression datastore. There may be various suitable procedures or techniques for initially determining bias suppression data so that a bias suppression datastore may be populated for use in locating UE devices based on signal travel time and bias suppression as described herein. In some implementations, for example, a bias suppression datastore may include bias suppression data that has been determined as part of a calibration procedure performed prior to the accessing of the bias suppression data by system 100 (e.g., at a point in time prior to system 100 capturing the time measurements to determine the location of the UE device). As another example, the bias suppression datastore may include bias suppression data that has been determined and continues to be updated by way of a crowdsourced learning procedure (e.g., such that the bias suppression data stored in the datastore is initialized and revised over time both before and after system 100 determines the location of the UE device). In this example, the calibration locations represented in the bias suppression datastore may be locations where users have taken time measurements at previous times.

Figure 6:
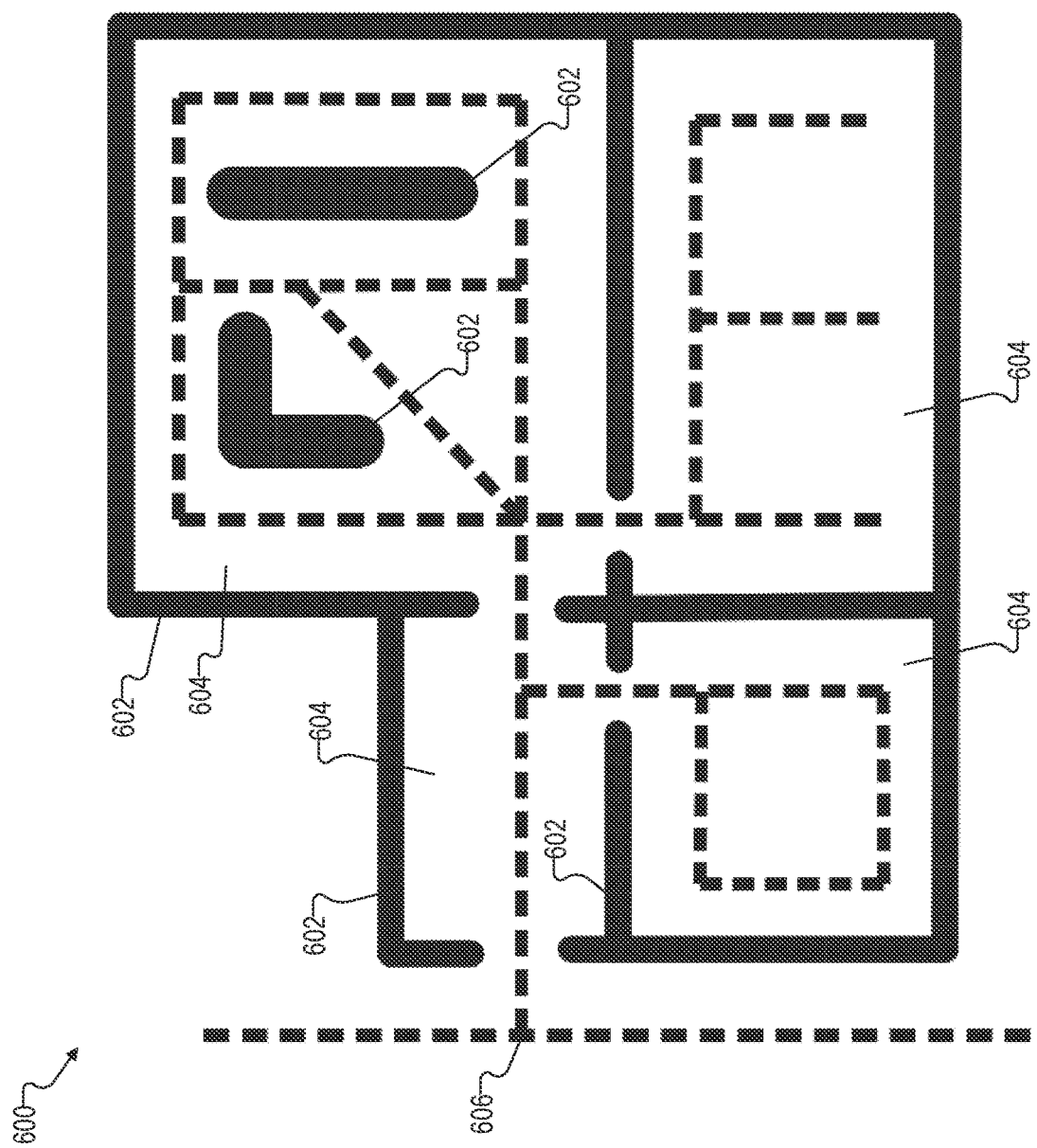
FIG. 6 shows an illustrative indoor area calibrated to facilitate methods and systems described herein for locating a UE device based on signal travel time and bias suppression in accordance with principles described herein.

FIG. 6 shows how an illustrative calibration process may be performed to capture and store bias suppression data for a bias suppression datastore. As shown, FIG. 6 depicts a top view of an example indoor area 600 that is calibrated to facilitate methods and systems described herein for locating UE devices based on signal travel time and bias suppression. Various walls 602, including inner and outer walls, are shown to form a number of rooms 604 within indoor area 600. While not explicitly shown in FIG. 6, it will be understood that a plurality of access point devices may be distributed throughout indoor area 600. For instance, the three access point devices 302-1 through 302-3 may be located in different rooms 604 within indoor area 600 in one example. Because of the many walls 602 and their relatively complex shapes and geometry, complex multipath and NLoS signal travel paths may be the norm for time measurements made by a UE device located in many locations within indoor area 600. For example, even if the UE device is nearby or has line-of-sight to one or two access point devices, one or more additional access point devices may be likely to be behind one or more walls 602 such that communications with those additional access point devices will be influenced by the multipath and/or NLoS complexities that have been described.

Accordingly, a calibration route 606 is shown as a dashed line that begins at an outer doorway on the left and eventually extends into each room 604 (and, in many examples, to different parts of each room). Calibration route 606 represents a route that a calibration device may traverse to collect bias suppression data for indoor area 600. For example, at various locations along calibration route 606 (e.g., every foot, every 5 feet, etc.), a calibration device carried by a user tasked with calibrating indoor area 600 may detect the statistical distributions for each distance measured to each of the detectable access point devices. In this way, the calibration device may gather statistical distribution data (such as statistical distribution 510) for each access point device at each calibration location along calibration route 606. Because the calibration locations for each measurement made during the calibration procedure may be known by other means, data associated with the detected statistical distributions may be stored in connection with actual locations in the bias suppression datastore.

It is noted that calibration route 606 does not cover every possible location within indoor area 600 that a UE device could ever be located (e.g., the route does not explore each and every corner and square inch of the space), but the route does cover each room thoroughly enough to capture an adequate understanding of how time measurement signaling can be expected to appear from calibration locations in each room and throughout the space. It will be understood that calibration route 606 is an example only and that more or less thorough coverage of indoor area 600 could be implemented to manage operational targets and resource requirement tradeoffs as may serve a particular implementation. For instance, a more thorough coverage (e.g., a grid-like calibration route that covers calibration locations throughout every part of every room 604) may ultimately allow for more accurate positioning at the expense of more work that must be done during calibration, more storage that must be allocated for the bias suppression datastore, and more processing that must be done to match time measurements captured by a UE device at an unknown location to the calibrated bias suppression data. Conversely, a less thorough calibration route that covers each room more sparsely could lessen the work of the calibration procedure and ease the resource requirements for the bias suppression datastore and processing at the expense of making the positioning system less accurate.

For each calibration location along calibration route 606, an entry representing the statistical distribution detected for that calibration location may be stored in a bias suppression datastore that is ultimately to be used by system 100 to locate UE devices based on signal travel time and bias suppression as described herein. While the most accurate positioning system may benefit from entries that capture such statistical distributions with great detail and nuance (e.g., representing each peak 512 and the detailed shape of statistical distribution 510 for every access point device at every calibration location), here again, practical tradeoffs between accuracy and resource availability may be made. For certain implementations, for instance, storing an average of the statistical distribution (e.g., average 514 of statistical distribution 510) or the average plus the standard deviation (e.g., average 514 and standard deviation 516 of statistical distribution 510) for each calibration location and access point device may be adequate for producing the desired positioning accuracy. In other implementations where more computing resources are available, additional information detailing the shape of the statistical distribution, the location of the peaks on the statistical distribution, and so forth, may be stored in addition to the basic mean and standard deviation information.

More precisely, certain implementations may operate using bias suppression data that is configured for use in suppressing an influence of the bias between the apparent distance and the true distance (the apparent and true distance between an unknown location of a UE device and a location of each access point device) by representing one or more features of a statistical distribution derived from measured signal travel time between one or more calibration locations and the location of each access point device. As has been described, the statistical distribution may be determined during a calibration procedure prior to the accessing of this bias suppression data, and, as will be described in more detail below, the calibration location may be in a vicinity of the location of the UE device and may allow system 100 to estimate the location of the UE device by interpolation. For example, the one or more features of the statistical distribution represented by the bias suppression data may include at least one of a mean of the statistical distribution, a standard deviation of the statistical distribution, a multi-gaussian representation of the statistical distribution (e.g., indicating each peak 512 of probability distribution curves 508 in the example of statistical distribution 510), a histogram representation of the statistical distribution (e.g., illustrating the overall shape of the statistical distribution), or any other representation of any aspect or aspects of the statistical distribution as may serve a particular implementation.

After an area such as indoor area 600 has been calibrated in accordance with these principles and a bias suppression datastore has been populated with suitable bias suppression data, methods and systems described herein for locating a UE device based on signal travel time and bias suppression may be performed. For example, system 100 may perform method 200 in an environment 300 such as indoor area 600. To illustrate, FIG. 7 shows an example dataflow 700 by way of which system 100 locates a UE device in accordance with principles described herein, and FIG. 8 illustrates a more detailed example of how method 200 may be performed in accordance with dataflow 700.

Figure 7:
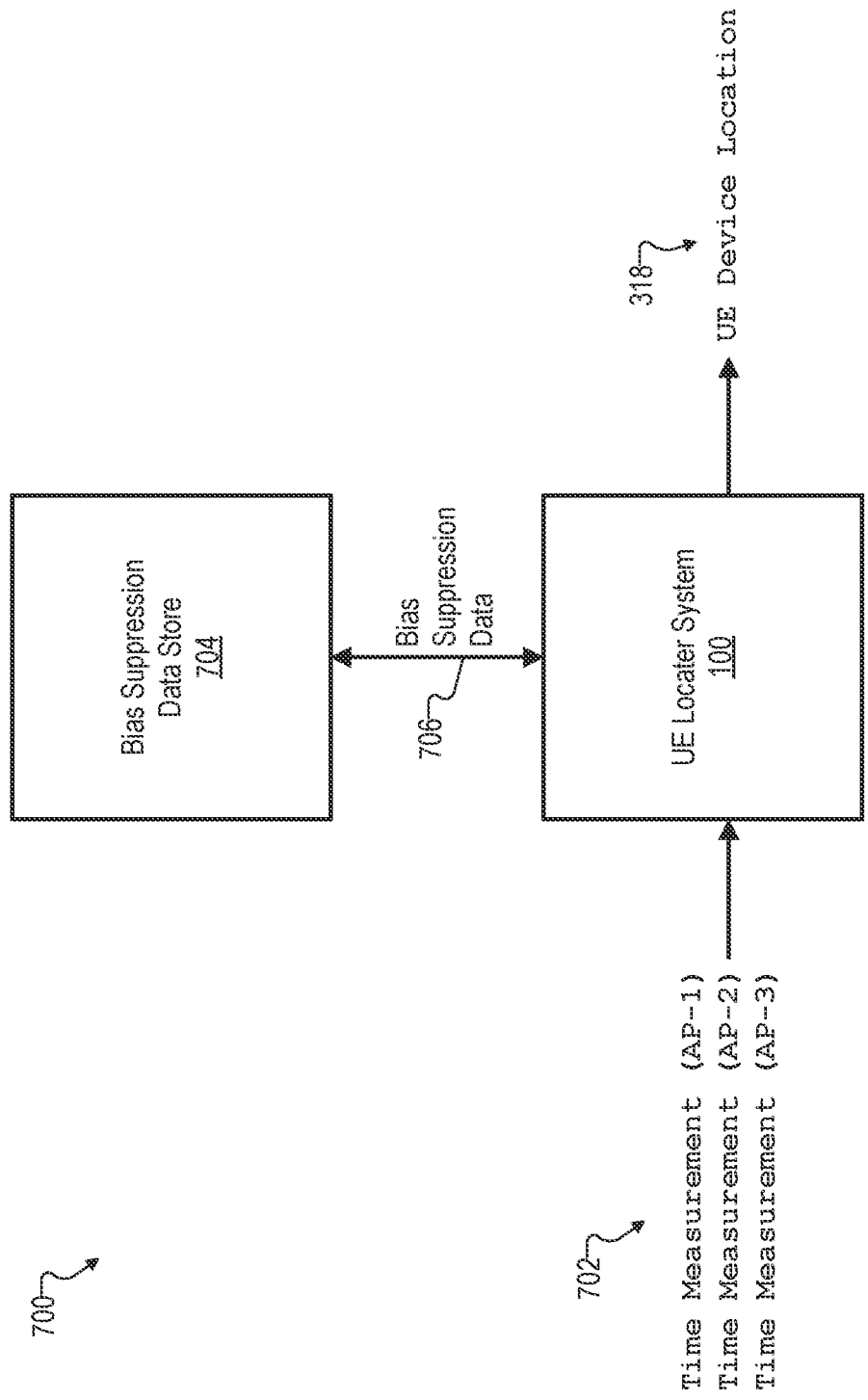
FIG. 7 shows an illustrative dataflow by way of which the UE locator system of FIG. 1 locates a UE device based on signal travel time and bias suppression in accordance with principles described herein.

More specifically, FIG. 7 illustrates that system 100 may determine a plurality of time measurements 702 for each of several access point devices (e.g., "Time Measurement (AP-1)" between UE device 304 and access point device 302-1, "Time Measurement (AP-2)" between UE device 304 and access point device 302-2, "Time Measurement (AP-3)" between UE device 304 and access point device 302-3, etc.). System 100 may determine time measurements 702 in any suitable way, such as by performing the measurements itself, by receiving the measurements from another system, or by otherwise generating or obtaining time measurements 702 in any manner as may serve a particular implementation. In this example, time measurements 702 will be understood to indicate signal travel times (e.g., RTT or other suitable times) between UE device 304 and each of access point devices 302 that have been illustrated and described above.

Because measured signal travel times correspond only to the apparent distances of UE device 304 to access point devices 302 (presuming LoS signal travel paths) and not necessarily the true distances, system 100 is shown to access pre-calibrated information from a bias suppression datastore 704. More specifically, system 100 accesses bias suppression data 706 that is configured for use in suppressing the influence of the bias between the apparent distance and the true distance between location 318 of UE device 304 and the respective locations 312 of access point devices 302 in any of the ways described herein (e.g., by representing only the mean of each statistical distribution, by representing the mean and the standard deviation, by representing a multi-gaussian or histogram-based representation that incorporates more detail of the statistical distribution, etc.). Based on time measurements 702 and bias suppression data 706, dataflow 700 shows that system 100 may estimate the location of the UE device (e.g., location 318 of UE device 304), which system 100 may then provide to UE device 304 or another system in accordance with whatever use case is being implemented or whatever end goal is targeted.

Figure 8:
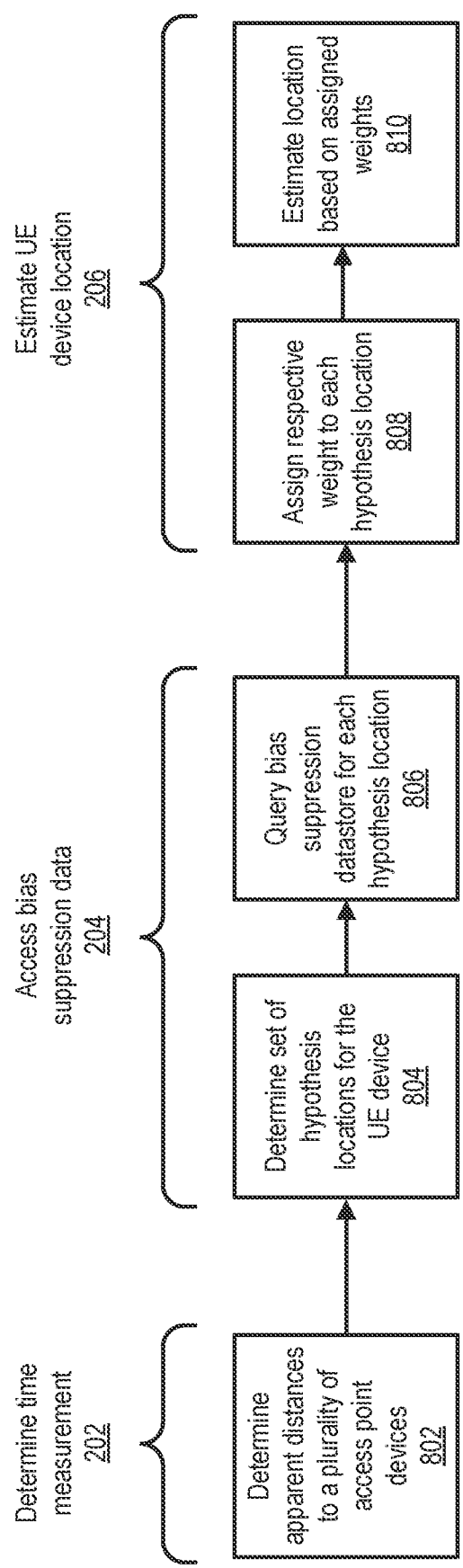
FIG. 8 shows a detailed example of how the method of FIG. 2 may be implemented in accordance with principles described herein.

FIG. 8 shows illustrative sub-operations 802-810 that, as shown, may be performed as part of the different operations 202-206 of method 200 to successfully achieve the outcomes described and illustrated in relation to dataflow 700. As will now be described in relation to FIGS. 8 and 9, performing operations 202-206 using sub-operations 802-810 may be one illustrative way to address a major challenge that the time-measurement, bias-suppression-based device positioning of method 200 may face. That challenge relates to how to query and assess the most relevant bias suppression data from the bias suppression datastore given the way in which the bias suppression data is captured and organized.

More specifically, one goal of system 100 may be summarized as identifying a fingerprint of the UE device's location based on time measurements, and then analyzing how that fingerprint relates to pre-calibrated fingerprints associated with one or more calibration locations represented within the bias suppression datastore to ultimately estimate where the UE device is likely to be located in relation to those calibration locations. In this way, system 100 may conclude that the UE device location is related to (e.g., proximate to, approximately the same as, etc.) the corresponding calibration location(s). Given this goal, an ideal way to query the bias suppression datastore would seem to be by accessing relevant bias suppression data by way of the fingerprint (e.g., inputting specific distances that have been measured for the device's current location such that the datastore outputs the calibration location whose calibrated fingerprint most closely aligns with these distances). The challenge arises because it may be inefficient and burdensome for the bias suppression data to be organized so as to be queried in this way. Instead, bias suppression data may be queried by inputting a particular location such that the datastore returns the fingerprint for that particular location (i.e., the statistical distribution for how each distance to each access point device was measured during calibration). In other words, while the relevant bias suppression data may be known to be somewhere in the bias suppression datastore, the challenge is that the datastore is query-able only by way of the same parameter that the system ultimately aims to discover: the location of the UE device.

Figure 9:
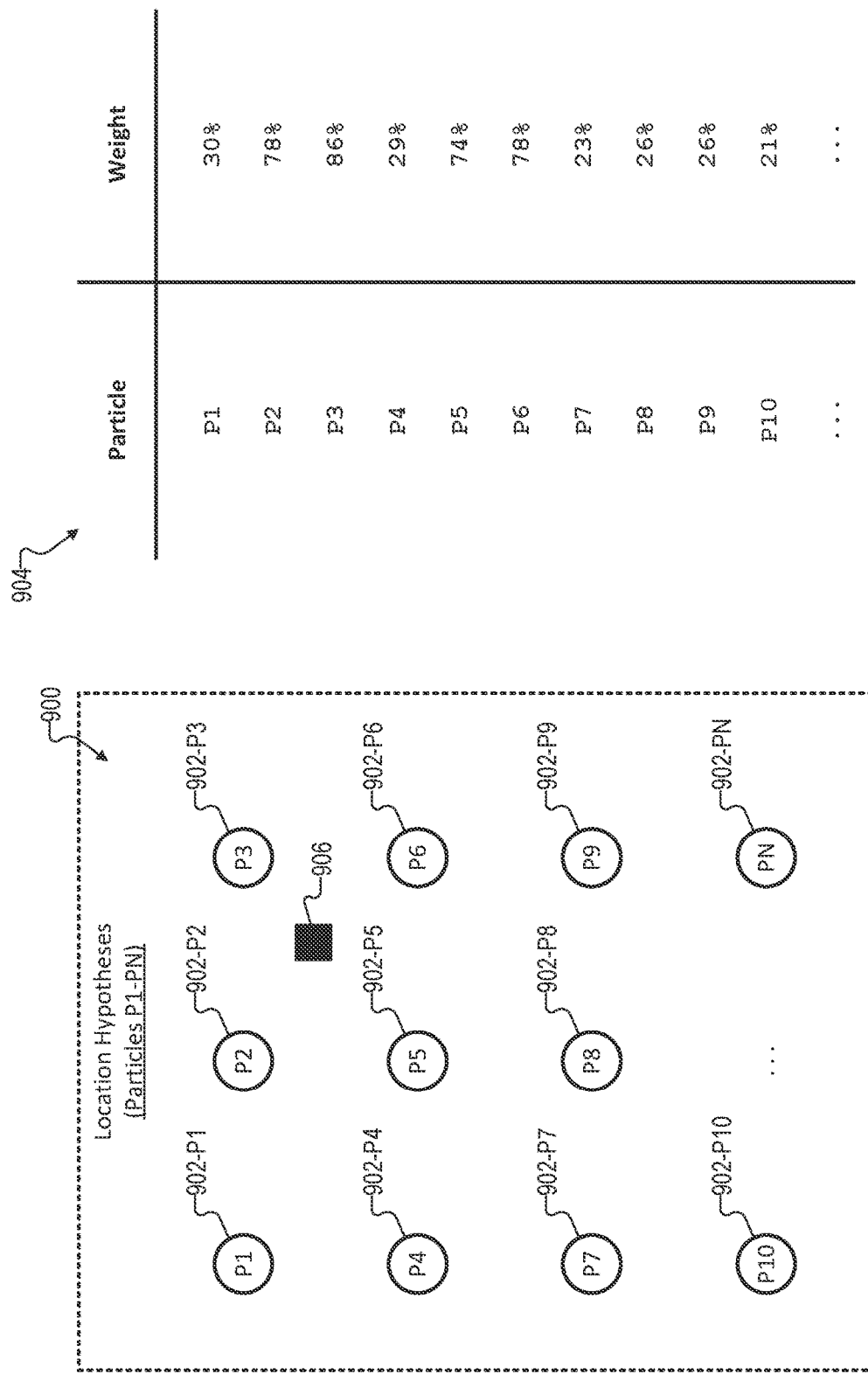
FIG. 9 shows illustrative aspects of how a particle filter technique may be employed to query a bias suppression datastore and enable the locating of a UE device in accordance with principles described herein.

Various strategies may be utilized to strategically query relevant bias suppression data from the bias suppression datastore to successfully effectively match the fingerprint of a set of time measurements determined by system 100 with the most similar fingerprints of the calibration locations represented within the bias suppression datastore (i.e., the fingerprints of the calibration locations most likely to be coincident with or nearby the location of the UE device). FIGS. 8 and 9 illustrate one particular strategy for overcoming this challenge.

At sub-operation 802, FIG. 8 shows that operation 202 may involve determining (e.g., based on time measurements 702 that have been measured by system 100 or obtained in another suitable way) apparent distances (e.g., assuming LoS communications) from the location of the UE device to the locations of a plurality of access point devices. Put another way, part of determining the time measurements at operation 202 may be to convert the time measurements into distances that form a fingerprint associated with the UE device's current location. While these distances are understood to be apparent distances and not necessarily true distances to the access point device, the fingerprint formed by these distances may well be distinct enough to estimate a true location of the UE device when analyzed in light of bias suppression data that has been stored during a calibration procedure or as part of an ongoing self-learning calibration protocol.

At sub-operations 804 and 806, FIG. 8 shows that the accessing of the bias suppression data from the bias suppression datastore of operation 204 may include: 1) determining a set of hypothesis locations for the UE device (sub-operation 804), and 2) querying the bias suppression datastore for each of the hypothesis locations in the set and receiving, in response to the querying, bias suppression data for each of the hypothesis locations in the set (sub-operation 806).

To illustrate, FIG. 9 shows illustrative aspects of how a particle filter technique may be employed to query the bias suppression datastore and enable the locating of a UE device in accordance with sub-operations 804 and 806. In FIG. 9, an area (e.g., a calibrated area analogous to indoor area 600 or another suitable area of an environment described herein) is shown with a plurality of particles 902 (e.g., particles 902-P1 through 902-PN, with an ellipsis representing any suitable number of additional particles that are not explicitly shown in FIG. 9). As indicated, each particle P1-PN (i.e., particles 902-P1 through 902-PN) represents a different location hypothesis for which the bias suppression datastore will be queried at sub-operation 806.

In area 900, particles 902 are shown to be distributed evenly across the area in a grid-like manner. For example, at sub-operation 804, the determining of the set of hypothesis locations may involve designating the hypothesis locations to every calibration location or to an evenly distributed subset of those locations that covers the entire area where the UE device may be located. This approach may be useful at the outset of the location tracking when system 100 has no prior knowledge of where the UE device is located. However, it will be understood that at other times (or in other types of implementations), particles P1-PN may be designated more strategically, such as based on where the UE device has already been determined to be located previously or based on unadjusted multilateration that presumes that all of the time measurements were made using direct LoS communications to get a rough estimation of where the UE device is located. In these examples, particles 902 may be initialized so to already approximate locations where the UE device is most likely to be, rather than treating each possible location as equally likely (as the uniform distribution of FIG. 9 does).

Returning to FIG. 8, the estimating of the location of the UE device performed for operation 206 is shown to include: 1) assigning a respective weight to each hypothesis location in the set based on respective degrees of agreement between the time measurement and the bias suppression data for each of the hypothesis locations in the set (sub-operation 808), and 2) estimating a location of the UE device based on the assigned weights (e.g., designating, as the estimated location, a weighted average location determined based on the set of hypothesis locations and the respective normalized weights assigned to each hypothesis location in the set) (sub-operation 810).

To illustrate, FIG. 9 shows a table 904 in which each of the particles 902 (i.e., particles P1-P10, as well as other potential particles represented by ellipses) is assigned a weigh representative of the likelihood of that particle being where the UE device is located. These weights may be determined in any suitable way or using any suitable algorithm, but, as mentioned above, each weight is assigned based on the degree to which time measurements for the UE device (i.e., the fingerprint that has been measured) align with the bias suppression data that has been accessed for the location hypothesized by the particular particle. Since the UE device is unlikely to be precisely positioned in a calibration location (and since the system may deal with some amount of noise even if the UE device were precisely located at the calibration location), it may be expected (as shown in this example) that no weight assigned to any particular particle is 100%. However, it is also shown that certain particles are assigned weights that are considerably higher than the weights assigned to other particles. For instance, particle P3 is shown to be assigned a weight of 86% (indicating a relatively high likelihood that the UE device is located near the hypothesized location of particle P3) while particle P10 is shown to be assigned a much lower weight of 21% (indicating a relatively low likelihood that the UE device is located near the hypothesized location of particle P10).

In some implementations, certain sub-operations such as the assigning of weights at sub-operation 808 may be performed repeatedly and progressively. For example, to utilize resources efficiently, a first pass of assignments such as illustrated by table 904 may be made and then a second pass may revise these values by eliminating the least likely particles, reassessing the most likely particles, and possibly adding additional particles near the areas determined to be more likely to host the UE device (i.e., the areas that have higher weights assigned in earlier passes). Various suitable filtering or matching techniques (e.g., particle filter techniques, point-mass-filter techniques, grid-based filter techniques, gradient search techniques, etc.) may be performed to help distinguish locations where the UE device is more likely to be from locations where the UE device is less likely to be. Then at sub-operation 810, an estimated location 906 (e.g. a weighted average location, a maximum likelihood location, etc.) may be designated based on the various hypothesis locations (i.e., particles 902) and their corresponding weights shown in table 904. Estimated location 906 may be the estimated location 318 that system 100 outputs as shown in FIG. 7 after performing method 200 as implemented by operations 802-810. Even if estimated location 906 is not precisely where UE device 304 is actually located, it is likely to be a close approximation to the true location of UE device 304 and, advantageously, it is an approximation that can be made regardless of whether time measurements 702 involve LoS communications, NLoS communications, multipath communications, or any other noise or disturbances that may be encountered in a complex real-world environment.

As mentioned above, different types of information may be stored as bias suppression data to allow for different approaches to dealing with calibrated and non-calibrated spaces and dealing with differing levels of knowledge regarding access point device locations in different implementations. For example, as mentioned, a "pure fingerprint-based" approach may only be operational in calibrated areas but may have the advantage of being operational without any knowledge of access point device locations since the UE device location is determined purely based on time measurements and pre-calibrated bias suppression data accessed from the bias suppression datastore.

More particularly, in these pure fingerprint-based implementations, bias suppression data may be configured for use in suppressing the influence of the bias between the apparent distance and the true distance between the UE device and an access point device by representing (e.g., for a calibration location in a vicinity of the location of the UE device) one or more features of a statistical distribution of measurements of an apparent distance of the calibration location from the location of the access point device. The statistical distribution in this type of bias suppression data is thus not only representative of the bias but of the entire measured distance between the calibration location and the access point device location. Accordingly, the estimating of the location of the UE device may be performed based on the calibration location and the one or more features of the statistical distribution represented by the bias suppression data without accounting for (or the system even having to have knowledge of) the location of the access point device.

To illustrate, FIG. 10A shows a first illustrative bias suppression datastore 1000-A that may be used to facilitate locating a UE device based on signal travel time and bias suppression in accordance with principles described herein. In this example, bias suppression data entries associated with different calibration locations (e.g., "Location 1" through "Location 6" and additional calibration locations represented by ellipses) are illustrated in dashed boxes within bias suppression datastore 1000-A. For instance, a first bias suppression data entry associated with "Location 1" (a location within the calibrated space at coordinates ($X_1$, $Y_1$)) is shown to include bias suppression data representing the apparent distance ("App. dist.") measured at Location 1 for each of three access point devices "AP-1," "AP-2," and "AP-3" (e.g., access point devices 302-1 through 302-3). Similarly, a second bias suppression data entry associated with "Location 2" (a location within the calibrated space at coordinates ($X_2$, $Y_2$)) is shown to include bias suppression data representing the apparent distance measured at Location 2 for each of the three access point devices AP-1, AP-2, and AP-3, and so forth for the other entries shown. These entries may be queried by location in the ways described above. For instance, if a hypothesis location (e.g., one of particles 902) is at Location 1, bias suppression datastore 1000-A may be queried for the entry associated with Location 1 and may supply the bias suppression data associated with this entry ("App. dist. AP-1," "App. dist. AP-2," and "App. dist. AP-3").

The bias suppression data represented for each access point device in each location entry in bias suppression datastore 1000-A may represent the apparent distance as it was measured during calibration in any of the ways described herein. For example, "App. dist. AP-1" may represent the mean, the mean plus the standard deviation, a multi-gaussian or histogram representation, or another suitable representation of the statistical distribution of distances detected at Location 1 for time measurements to access point device AP-1. "App. dist. AP-2" may represent the corresponding information for Location 1 to access point device AP-2, and so forth. Because all that is represented is the apparent distance as measured during calibration, there is no need for the system to have knowledge of where the access point devices AP-1 through AP-3 are actually located, which may be convenient in certain implementations. The tradeoff, however, would be that this pure fingerprint-based approach may only function properly within the calibrated area.

While a single bias suppression datastore 1000-A is shown to include the entire fingerprint for each location (i.e., the apparent distance information to each of access point devices AP-1 through AP-3), it will be understood that the bias suppression data could, in other implementations, be organized in other ways. For instance, three individual bias suppression datastores associated with each of the three access point devices of this example could be queried individually based on the location and the bias suppression data provided by each could be aggregated into a single fingerprint to compare to the measured fingerprint of the UE device.

Another example mentioned above for the different types of information that may be stored as bias suppression data relates to a "hybrid fingerprint-based" approach that requires the system to have knowledge of access point device locations but also enjoys the advantage of being operational in calibrated and non-calibrated areas. In this way, the hybrid approach may provide a "graceful degradation" from the high degree of positioning accuracy available in a calibrated area to a more approximated accuracy available outside of the calibrated area.

In a hybrid fingerprint-based implementation, bias suppression data may be configured for use in suppressing the influence of the bias between the apparent distance and the true distance between the UE device and an access point device by representing (e.g., for a calibration location in a vicinity of the location of the UE device) one or more features of a statistical distribution of measurements of difference between an apparent distance and a true distance of the calibration location from the location of the access point device. The statistical distribution in this type of bias suppression data is thus not representative of the entire measured distance between the calibration location and the access point device location, but just of the bias itself (thereby requiring that the actual location of the access point device be known so that the bias can be determined as the difference between the true distance and the apparent distance that has been measured). Accordingly, the estimating of the location of the UE device may be performed based on the calibration location, the one or more features of the statistical distribution represented by the bias suppression data, and the location of the access point device (used to determine the true distance).

To illustrate, FIG. 10B shows a second illustrative bias suppression datastore 1000-B that may be used to facilitate locating a UE device based on signal travel time and bias suppression in accordance with principles described herein. Similarly to bias suppression datastore 1000-A, bias suppression data entries in this datastore may be associated with different calibration locations (e.g., "Location 1" through "Location 6" and additional calibration locations represented by ellipses) and are illustrated in dashed boxes. For instance, a first bias suppression data entry associated with "Location 1" (the calibration location within the calibrated space at coordinates $(X_1, Y_1)$) is shown to include bias suppression data representing the distance bias ("Dist. Bias") measured at Location 1 for each of three access point devices "AP-1," "AP-2," and "AP-3" (e.g., access point devices 302-1 through 302-3). Similarly, a second bias suppression data entry associated with "Location 2" (a calibration location within the calibrated space at coordinates $(X_2, Y_2)$) is shown to include bias suppression data representing the distance bias measured at Location 2 for each of the three access point devices AP-1, AP-2, and AP-3, and so forth for the other entries shown. These entries may be queried by location in the ways described above. For instance, if a hypothesis location (e.g., one of particles 902) is at Location 1, bias suppression datastore 1000-B may be queried for the entry associated with Location 1 and may supply the bias suppression data associated with this entry ("Dist. Bias AP-1," "Dist. Bias AP-2," and "Dist. Bias AP-3").

The bias suppression data included for each access point device in each location entry in bias suppression datastore 1000-B may represent the distance bias as determined by calculating the difference between the apparent distance (as measured during calibration in any of the ways described herein) and the true distance (as determined based on the system's knowledge of both the calibration location and the access point device location), In like manner as described above for the entries of bias suppression datastore 1000-A, these entries may each represent the mean, the mean plus the standard deviation, a multi-gaussian or histogram representation, or another suitable representation of the statistical distribution of the bias from Location 1 to a given access point device. Because the distance bias provided by bias suppression datastore 1000-B allows for apparent distances measured to be corrected to better resemble true distances, system 100 may still need to perform a multilateration step using the corrected measurements (i.e., estimations of the true distances) to determine the location of the UE device. The payoff, however, for taking this additional step would be that uncorrected measurements may seamlessly be used together with and/or in place of corrected measurements as a UE device location moves in and out of a calibrated area. For example, if queried about a location for which bias suppression datastore 1000-B has no entry (e.g., a location outside of the calibrated area), bias suppression datastore 1000-B may output default bias suppression data (e.g., a null value representative of zero distance bias, etc.) that may be configured to enable the location of the UE device to be estimated (albeit with less accuracy) even when the location of the UE device is outside of a vicinity of any calibration location.

In situations outside of the calibration area where the device positioning is based on uncorrected distance measurements (and, in certain cases, even in situations within the calibration area), additional techniques and technologies may be employed together with the techniques and technologies described above for locating the UE device based on signal travel time and bias suppression. For instance, the robustness and accuracy of system 100 may potentially be improved even further through sensor fusion with available sensors of the UE device such as accelerometers, gyroscopes, compasses, barometers, radio transceivers, light sensors (e.g., cameras, infrared sensors, etc.), sound sensors, chemical sensors, and/or other suitable sensors as may serve a particular implementation.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 11:
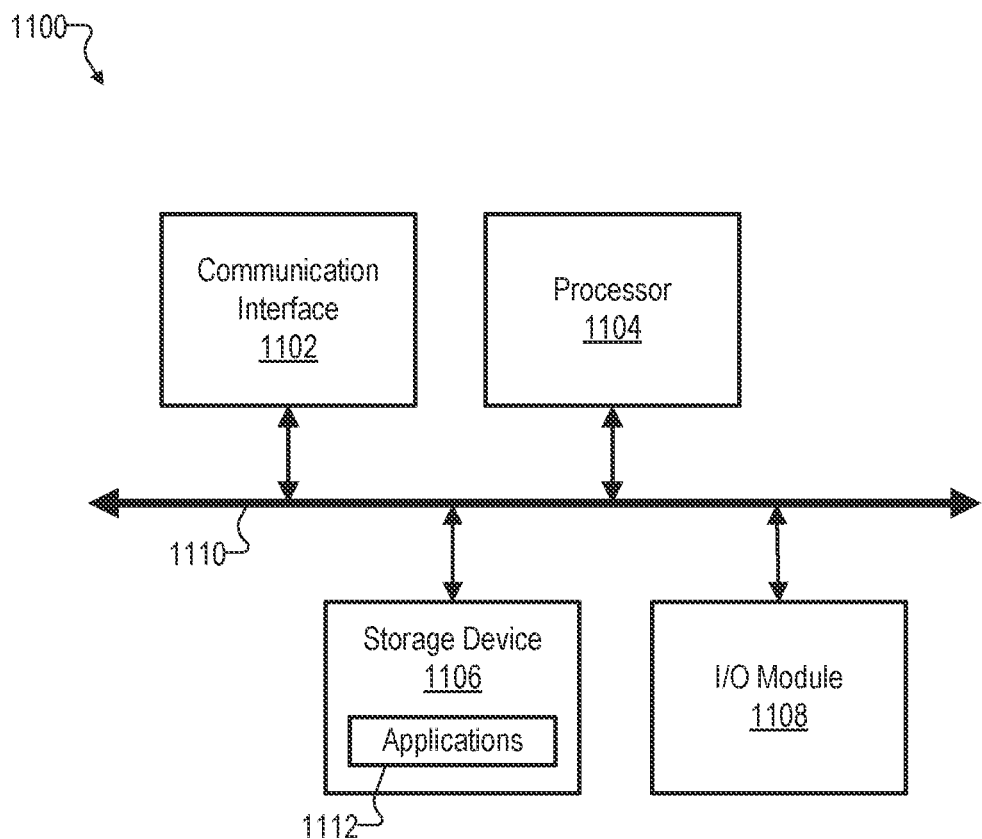
FIG. 11 shows an illustrative computing device that may implement UE locator systems and/or other computing systems and devices described herein in accordance with principles described herein.

FIG. 11 shows an illustrative computing device 1100 that may implement UE locator systems and/or other computing systems and devices described herein in accordance with principles described herein. For example, computing device 1108 may include or implement (or partially implement) a UE locator system such as system 100, a UE device such as UE device 304, an access point device such as any of access point devices 302, a bias suppression datastore such as any of bias suppression datastores 704, 1000-A, or 1000-B, any components included therein, or other devices or systems associated therewith.

As shown in FIG. 11, computing device 1100 may include a communication interface 1102, a processor 1104, a storage device 1106, and an input/output (I/O) module 1108 communicatively connected via a communication infrastructure 1110. While an illustrative computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with processor 104 of system 100. Likewise, memory 102 of system 100 may be implemented by or within storage device 1106.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   determining, by a user equipment (UE) locator system, a time measurement indicative of a signal travel time between a UE device and an access point device, the signal travel time corresponding to an apparent distance, presuming a line-of-sight (LoS) signal travel path, between a location of the UE device and a location of the access point device;
   determining, by the UE locator system, a set of hypothesis locations for the UE device;
   accessing, by the UE locator system from a bias suppression datastore, bias suppression data configured for use in suppressing an influence of a bias between the apparent distance and a true distance between the location of the UE device and the location of the access point device, the bias suppression data corresponding to each hypothesis location in the set of hypothesis locations for the UE device; and
   estimating, by the UE locator system based on the time measurement and the bias suppression data, the location of the UE device by determining a weighted average location based on the set of hypothesis locations and a respective weight assigned to each hypothesis location in the set based on respective degrees of agreement between the time measurement and the bias suppression data for each of the hypothesis locations in the set.

2. The method of claim 1, further comprising determining, by the UE locator system, an additional time measurement indicative of an additional signal travel time between the UE device and an additional access point device;
   wherein the estimating of the location of the UE device is further based on the additional time measurement.

3. The method of claim 1, wherein the bias suppression data is configured for use in suppressing the influence of the bias between the apparent distance and the true distance by representing one or more features of a statistical distribution derived from measured signal travel time between a calibration location and the location of the access point device, the calibration location in a vicinity of the location of the UE device and the statistical distribution determined during a calibration procedure prior to the accessing of the bias suppression data.

4. The method of claim 3, wherein the one or more features of the statistical distribution represented by the bias suppression data include at least one of:
   a mean of the statistical distribution;
   a standard deviation of the statistical distribution;

a multi-gaussian representation of the statistical distribution; or a histogram representation of the statistical distribution.

5. The method of claim 1, wherein the time measurement is a round-trip time (RTT) measurement for a signal communicated from the UE device to the access point device or for a signal communicated from the access point device to the UE device.

6. The method of claim 1, wherein the time measurement is at least one of:
a time-of-flight (ToF) measurement for a signal communicated from the UE device to the access point device or for a signal communicated from the access point device to the UE device;
a time-of-arrival (ToA) measurement for a signal received by the UE device from the access point device or for a signal received by the access point device from the UE device; or
a time-difference-of-arrival (TDoA) measurement between signals received by the UE device from the access point device and from an additional access point device.

7. The method of claim 1, wherein:
the bias suppression data is configured for use in suppressing the influence of the bias between the apparent distance and the true distance by representing, for a calibration location in a vicinity of the location of the UE device, one or more features of a statistical distribution of measurements of an apparent distance of the calibration location from the location of the access point device; and
the estimating of the location of the UE device is performed based on the calibration location and the one or more features of the statistical distribution represented by the bias suppression data without accounting for the location of the access point device.

8. The method of claim 1, wherein:
the bias suppression data is configured for use in suppressing the influence of the bias between the apparent distance and the true distance by representing, for a calibration location in a vicinity of the location of the UE device, one or more features of a statistical distribution of measurements of a difference between an apparent distance and a true distance of the calibration location from the location of the access point device; and
the estimating of the location of the UE device is performed based on the calibration locations, the one or more features of the statistical distribution represented by the bias suppression data, and the location of the access point device.

9. The method of claim 8, wherein the bias suppression datastore outputs default bias suppression data configured to enable the location of the UE device to be estimated when the location of the UE device is outside of a vicinity of any calibration location.

10. The method of claim 1, wherein the bias suppression datastore includes bias suppression data that has been determined as part of a calibration procedure performed prior to the accessing of the bias suppression data.

11. The method of claim 1, wherein the bias suppression datastore includes bias suppression data that has been determined and continues to be updated by way of a crowd-sourced learning procedure.

12. A system comprising:
a memory storing instructions; and
a processor communicatively coupled to the memory and configured to execute the instructions to:
determine a time measurement indicative of a signal travel time between a UE device and an access point device, the signal travel time corresponding to an apparent distance, presuming a line-of-sight (LoS) signal travel path, between a location of the UE device and a location of the access point device;
determine a set of hypothesis locations for the UE device;
access, from a bias suppression datastore, bias suppression data configured for use in suppressing an influence of a bias between the apparent distance and a true distance between the location of the UE device and the location of the access point device, the bias suppression data corresponding to each hypothesis location in the set of hypothesis locations for the UE device; and
estimate, based on the time measurement and the bias suppression data, the location of the UE device by determining a weighted average location based on the set of hypothesis locations and a respective weight assigned to each hypothesis location in the set based on respective degrees of agreement between the time measurement and the bias suppression data for each of the hypothesis locations in the set.

13. The system of claim 12, wherein:
the processor is further configured to execute the instructions to determine an additional time measurement indicative of an additional signal travel time between the UE device and an additional access point device; and
the estimating of the location of the UE device is further based on the additional time measurement.

14. The system of claim 12, wherein:
the accessing of the bias suppression data from the bias suppression datastore includes:
determining a set of hypothesis locations for the UE device, and
querying the bias suppression datastore for each of the hypothesis locations in the set and receiving, in response to the querying, bias suppression data for each of the hypothesis locations in the set.

15. The system of claim 12, wherein the bias suppression data is configured for use in suppressing the influence of the bias between the apparent distance and the true distance by representing one or more features of a statistical distribution derived from measured signal travel time between a calibration location and the location of the access point device, the calibration location in a vicinity of the location of the UE device and the statistical distribution determined during a calibration procedure prior to the accessing of the bias suppression data, the one or more features including at least one of:
a mean of the statistical distribution;
a standard deviation of the statistical distribution;
a multi-gaussian representation of the statistical distribution; or
a histogram representation of the statistical distribution.

16. The system of claim 12, wherein the time measurement is a round-trip time (RTT) measurement for a signal communicated from the UE device to the access point device or for a signal communicated from the access point device to the UE device.

17. The system of claim 12, wherein:
the bias suppression data is configured for use in suppressing the influence of the bias between the apparent distance and the true distance by representing, for a calibration location in a vicinity of the location of the UE device, one or more features of a statistical distribution of measurements of a difference between an apparent distance and a true distance of the calibration location from the location of the access point device; and the estimating of the location of the UE device is performed based on the calibration locations, the one or more features of the statistical distribution represented by the bias suppression data, and the location of the access point device.

18. The system of claim 17, wherein the bias suppression datastore outputs default bias suppression data configured to enable the location of the UE device to be estimated when the location of the UE device is outside of a vicinity of any calibration location.

19. A non-transitory computer-readable medium storing instructions that, when executed, direct a processor of a computing device to:

determine a time measurement indicative of a signal travel time between a UE device and an access point device, the signal travel time corresponding to an apparent distance, presuming a line-of-sight (LoS) signal travel path, between a location of the UE device and a location of the access point device;

determine a set of hypothesis locations for the UE device;

access, from a bias suppression datastore, bias suppression data configured for use in suppressing an influence of a bias between the apparent distance and a true distance between the location of the UE device and the location of the access point device, the bias suppression data corresponding to each hypothesis location in the set of hypothesis locations for the UE device; and estimate, based on the time measurement and the bias suppression data, the location of the UE device by determining a weighted average location based on the set of hypothesis locations and a respective weight assigned to each hypothesis location in the set based on respective degrees of agreement between the time measurement and the bias suppression data for each of the hypothesis locations in the set.

20. The method of claim 1, wherein:

the accessing of the bias suppression data from the bias suppression datastore includes querying the bias suppression datastore for each of the hypothesis locations in the set and receiving, in response to the querying, bias suppression data for each of the hypothesis locations in the set.

* * * * *